United States Patent
Cote

(10) Patent No.: US 9,282,336 B2
(45) Date of Patent: *Mar. 8, 2016

(54) METHOD AND APPARATUS FOR QP MODULATION BASED ON PERCEPTUAL MODELS FOR PICTURE ENCODING

(75) Inventor: Guy Cote, San Jose, CA (US)

(73) Assignee: GEO SEMICONDUCTOR INC., San Jose, CA (US)

( * ) Notice: Subject to any disclaimer, the term of this patent is extended or adjusted under 35 U.S.C. 154(b) by 913 days.

This patent is subject to a terminal disclaimer.

(21) Appl. No.: 13/419,294

(22) Filed: Mar. 13, 2012

(65) Prior Publication Data

US 2013/0121403 A1    May 16, 2013

Related U.S. Application Data

(63) Continuation of application No. 11/332,025, filed on Jan. 16, 2006, now Pat. No. 8,135,062.

(51) Int. Cl.
| | |
|---|---|
| *H04N 19/196* | (2014.01) |
| *H04N 19/172* | (2014.01) |
| *H04N 19/176* | (2014.01) |
| *H04N 19/126* | (2014.01) |

(52) U.S. Cl.
CPC .......... *H04N 19/198* (2014.11); *H04N 19/126* (2014.11); *H04N 19/172* (2014.11); *H04N 19/176* (2014.11); *H04N 19/196* (2014.11)

(58) Field of Classification Search
CPC . H04N 19/198; H04N 19/126; H04N 19/172; H04N 19/176; H04N 19/196

USPC .......................................... 375/240.3, E7.14
See application file for complete search history.

(56) References Cited

U.S. PATENT DOCUMENTS

| | | | |
|---|---|---|---|
| 6,192,154 B1 * | 2/2001 | Rajagopalan et al. | 382/232 |
| 6,810,083 B2 * | 10/2004 | Chen et al. | 375/240.25 |
| 7,092,441 B1 * | 8/2006 | Hui et al. | 375/240.03 |
| 7,483,488 B1 * | 1/2009 | Hsu et al. | 375/240.12 |
| 7,822,117 B1 * | 10/2010 | Linzer et al. | 375/240.03 |
| 8,135,062 B1 * | 3/2012 | Cote | 375/240.03 |
| 2002/0031185 A1 * | 3/2002 | Webb | 375/240.23 |
| 2003/0123539 A1 * | 7/2003 | Kim et al. | 375/240.03 |
| 2005/0058198 A1 * | 3/2005 | Zhao et al. | 375/240.03 |
| 2005/0105815 A1 * | 5/2005 | Zhang et al. | 382/251 |
| 2005/0180500 A1 * | 8/2005 | Chiang et al. | 375/240 |

(Continued)

FOREIGN PATENT DOCUMENTS

WO    WO 9949664 A1 * 9/1999

OTHER PUBLICATIONS

"10 Rate Control and Quantization Control," http://www.mpeg.org/MSSG/tm5/CH10/Ch10.html, 1993, pp. 1-5.*

(Continued)

*Primary Examiner* — Christopher S Kelley
*Assistant Examiner* — Kathleen Walsh
(74) *Attorney, Agent, or Firm* — Sughrue Mion, PLLC

(57) ABSTRACT

A method for encoding a picture is disclosed. The method generally includes the steps of (A) generating at least one respective macroblock statistic from each of a plurality of macroblocks in the picture, (B) generating at least one global statistic from the picture and (C) generating a respective macroblock quantization parameter for each of the macroblocks based on both (i) the at least one respective macroblock statistic and (ii) said at least one global statistic.

20 Claims, 5 Drawing Sheets

(56) References Cited

U.S. PATENT DOCUMENTS

2005/0201460 A1* 9/2005 Kang et al. ............... 375/240.03
2005/0220352 A1* 10/2005 Wemelsfelder ............... 382/232
2009/0225829 A2* 9/2009 Kwon et al. ............. 375/240.03

OTHER PUBLICATIONS

Chun-Hsien Chou and Yun-Chin Li, "A Perceptually Tuned Subband Image Coder Based on the Measure of Just-Noticeable-Distortion Profile", IEEE Transactions on Circuits and Systems for Video Technology, vol. 5, No. 6, Dec. 1995, pp. 467-476.

"10 Rate Control and Quantization Control", http://www.mpeg.org/MSSG/tm5/CH10/Ch10.html, Apr. 1993, 5 pages.

Final Office Action for U.S. Appl. No. 11/332,028, dated Aug. 17, 2011.

Non-Final Office Action for U.S. Appl. No. 11/332,028, dated Mar. 2, 2011.

* cited by examiner

METHOD AND APPARATUS FOR QP MODULATION BASED ON PERCEPTUAL MODELS FOR PICTURE ENCODING

CROSS REFERENCE TO RELATED PATENT APPLICATIONS

The present application is a continuation of and claims priority under 35 U.S.C. §120 to U.S. application Ser. No. 11/332,025, entitled "Method and Apparatus for QP Modulation Based On Perceptual Model for Picture Encoding," filed by Guy Cote on Jan. 16, 2006 now U.S. Pat. No. 8,135,062, which is hereby incorporated by reference in its entirety.

FIELD OF THE INVENTION

The present invention relates to picture processing generally and, more particularly, to a method and/or architecture for quantization parameter modulation based on perceptual models for picture encoding.

BACKGROUND OF THE INVENTION

Sensitivity of the human eye is not constant under all conditions. In particular, contrast variations within different area types in a picture are commonly perceived differently. Therefore, encoding areas of the picture where the human eye is less sensitive using the same number of bits as areas of the picture where the human eye is more sensitive is inefficient.

SUMMARY OF THE INVENTION

The present invention concerns a method for encoding a picture. The method generally comprises the steps of (A) generating at least one respective macroblock statistic from each of a plurality of macroblocks in the picture, (B) generating at least one global statistic from the picture and (C) generating a respective macroblock quantization parameter for each of the macroblocks based on both (i) the at least one respective macroblock statistic and (ii) said at least one global statistic.

The objects, features and advantages of the present invention include providing a method and/or architecture for quantization parameter modulation based on perceptual models for picture encoding that may (i) increase encoding efficiency compared with conventional approaches, (ii) account for variations in the Human Visual System and/or (iii) adapt to ambient (DC) luminance levels in a picture.

BRIEF DESCRIPTION OF THE DRAWINGS

These and other objects, features and advantages of the present invention will be apparent from the following detailed description and the appended claims and drawings in which:

DETAILED DESCRIPTION OF THE PREFERRED EMBODIMENTS

The present invention generally concerns a quantization parameter (QP) modulation technique using macroblock statistics and picture statistics gathered from picture preprocessing operations. The macroblock statistics may comprise (i) a macroblock luminance (luma) motion average value, (ii) a macroblock luma average (DC) value, (iii) a macroblock luma high-frequency average value, (iv) a macroblock luma spatial edge strength average value and/or (v) a macroblock luma temporal edge strength average value. The global picture (or global image) statistics generally concern corresponding global picture averages (normalized per macroblock) comprising (i) a global picture luma motion average value, (ii) a global picture luma DC average value, (iii) a global picture luma high-frequency average value, (iv) a global picture luma spatial edge strength average value and/or (v) a global picture luma temporal edge strength average value. Based on the macroblock statistics and the global statistics, a respective quantization parameter for each macroblock may be modulated to take advantage of the characteristics of a Human Visual System (HVS).

Figure 1:
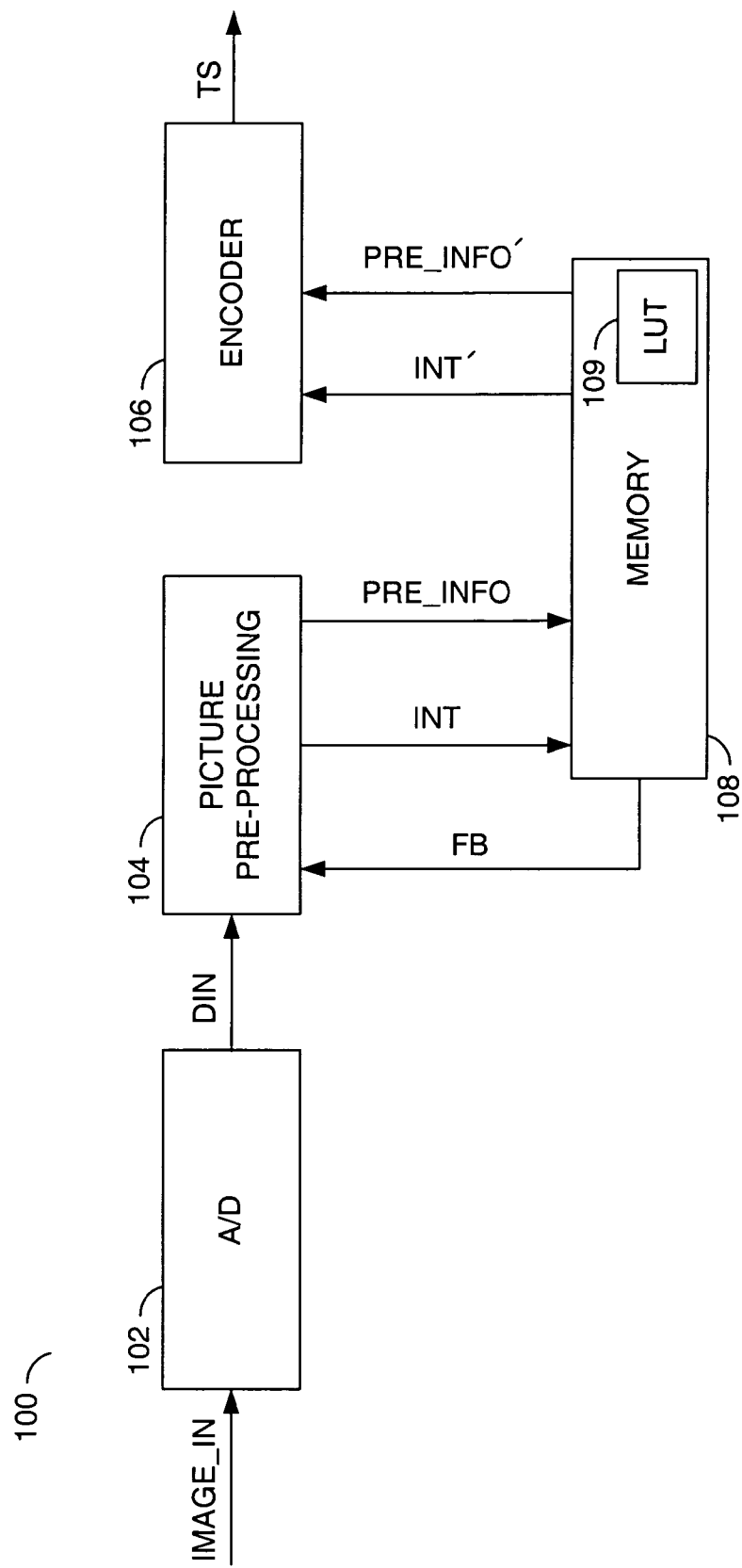
FIG. 1 is a block diagram of a system shown in accordance with a preferred embodiment of the present invention.

Referring to FIG. 1, a block diagram of a system 100 is shown in accordance with a preferred embodiment of the present invention. The system (or circuit) 100 may be referred to as an encoding system. The encoding system 100 generally comprises a circuit (or block) 102, a circuit (or block) 104, a circuit (or block) 106 and a circuit (or block) 108. An input signal (e.g., IMAGE_IN) may be received by the circuit 102. The circuit 102 may present a signal (e.g., DIN) to the circuit 104. The circuit 104 may present an intermediate signal (e.g., INT) to the circuit 108. A signal (e.g., PRE_INFO) may also be presented from the circuit 104 to the circuit 108. A feedback signal (e.g., FB) may be presented from the circuit 108 back to the circuit 104. The circuit 108 may present another intermediate signal (e.g., INT') to the circuit 106. A signal (e.g., PRE_INFO') may also be presented from the circuit 108 to the circuit 106. An output signal (e.g., TS) may be generated and presented by the circuit 106.

The signal IMAGE_IN may be implemented as either an analog picture signal or a digital picture signal. When the signal IMAGE_IN is in the digital form (e.g., DIN=IMAGE_IN), the circuit 102 may be excluded from the encoding system 100.

The signal TS may be implemented as video transport signal (or stream). In some embodiments, the transport signal TS (e.g., video bitstream) may be compliant with an H.264/AVC standard. The H.264/AVC standard is published by Joint Video Team (JVT) of the International Organization for Standardization/International Electrotechnical Commission (ISO/IEC) Moving Picture Experts Group (MPEG) and the Video Coding Expert Group (VCEG) of the International Telecommunications Union-Telecommunications (ITU-T) Standardization Sector, Geneva, Switzerland. In other embodiments, the transport signal TS may be compliant with an H.263 standard, an H.262 standard or an H.261 standard, also published by the ITU-T. In still other embodiments, the transport signal TS may be compliant with an MPEG-2 standard or an MPEG-4 standard, published by the ISO/IEC MPEG, Geneva, Switzerland. In still other embodiments, the transport signal TS (e.g., image files) may be compliant with the JPEG, a Tagged Image File Format (TIFF), a Graphics Interchange Format (GIF) and a Portable Network Graphics (PNG) standards. Other image coding standards, video coding standards and proprietary formats may be implemented to meet the criteria of a particular application.

The circuit 102 may be referred to as an analog-to-digital (A/D) module. The A/D module 102 may be operational to digitize the input signal IMAGE_IN to generate the signal DIN, where the input signal IMAGE_IN is implemented as an analog signal. A content of the signal IMAGE_IN may be either a sequence of video pictures (e.g., frames and/or fields) or a still image. The signal DIN may carry a digital representation of each picture in the signal IMAGE_IN.

The circuit 104 may be referred to as a picture pre-processing (PPP) module. The PPP module 104 may be operational to perform pre-encoding processing on the pictures in the signal DIN to generate the intermediate signal INT. Processing may include, but is not limited to, spatial processing, color processing, temporal processing, luminance edge detection, color edge detection, macroblock statistic generation, picture statistic generation and the like for better compression and image quality results after encoding. The signal INT may carry the post-processed versions of the pictures received in the signal DIN. The PPP module 104 may also generate statistics gathered from (i) the pictures and (ii) multiple macroblocks within the pictures. The statistics data may be presented in the signal PRE_INFO for temporary storage in the circuit 108.

The circuit 108 may be referred to as a memory module. The memory module 108 may be configured as a buffer for temporarily storing the pictures received in the signal INT and the statistic data received in the signal PRE_INFO. The pictures may be read from the memory module 108 in the signal INT'. The statistics may be read from the memory module 108 in the signal PRE_INFO'. A portion of the picture data may also be read from the memory module 108 in the signal FB. The feedback information in the signal FB may be used by the PPP module 104 to aid in the processing of subsequent pictures (e.g., temporal processing).

The circuit 106 may be referred to as an encoder module. The encoder module 106 may be operational to encoding the pictures received in the signal INT'. The encoded pictures may be presented in the signal TS. The encoding may result in the signal TS in compliance with at least one of the H.264, H.263, H.262, H.261, MPEG-2 and MPEG-4 video standards, the JPEG, TIFF, GIF, PNG image standards and other proprietary formats.

The encoding system 100 may exploit the characteristics of the Human Visual System (HVS) (e.g., how humans perceive visual information) to achieve a distribution of quantization parameters (e.g., QP) for each macroblock in each picture. First, the HVS is less sensitive to high frequency areas, so a larger quantizer step size may be used in the high frequency areas. Second, the HVS is less sensitive to high motion areas, so a larger quantizer step size may be used in the high motion areas. Third, the HVS is less sensitive to areas where a DC value is away from either (i) the picture DC or (ii) a mid-level value (e.g., a digital value of 128 in a range of 0 to 255), so a larger quantizer step size may be used in such areas. Fourth, the HVS is more sensitive to areas that have strong edges, so a smaller quantizer step size may be used in areas of spatial edges and/or temporal edges. The above factors may be combined to modulate the quantizer step size for every macroblock.

Figure 2:
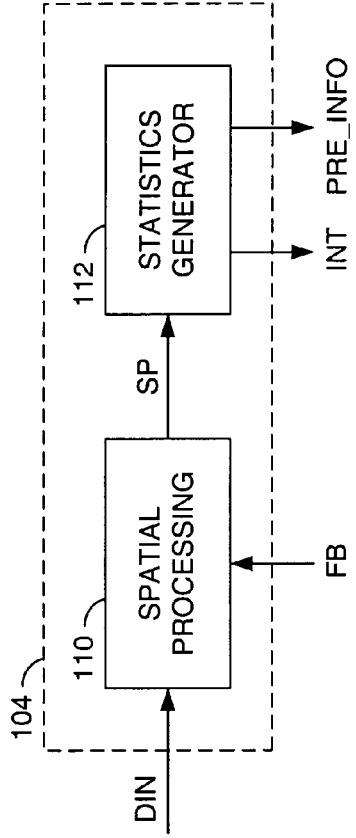
FIG. 2 is a detailed block diagram of a portion of a picture pre-processing module.

Referring to FIG. 2, a detailed block diagram of a portion of the PPP module 104 is shown. The PPP module 104 generally comprises a circuit (or block) 110 and a circuit (or block) 112. The circuit 110 may receive the digital signal DIN and the feedback signal FB. An internal signal (e.g., SP) may be generated by the circuit 110 and presented to the circuit 112. The circuit 112 may generate the intermediate signal INT and the signal PRE_INFO written to the memory module 108.

The circuit 110 may be referred to as a spatial processing module. The spatial processing module 110 may be operational to provide spatial adjustments to the pictures received in the signal DIN to generate the internal signal SP. The adjustments may include, but are not limited to, cropping, scaling, noise reduction and the like. The spatial processing module 110 may also provide advanced information to the encoding module 106 by means of statistics gathering. The encoding module 106 generally uses the advanced information to make better decisions regarding rate control and mode selection when encoding the pictures in the signal INT'.

The circuit 112 may be referred to as a statistics generator module. The statistics generator module 112 may be operational to generate statistics for the pictures at both a macroblock level and at a picture level. The statistics may be written to the memory module 108 via the signal PRE_INFO. Macroblock level statistics generally include (i) a luma motion average value (e.g., $MB_{MOT}$), (ii) a luma DC value (e.g., $MB_{DC}$) that may represent an average luma value among all of the pixels in the macroblock, (iii) a luma high-frequency average value (e.g., $MB_{HF}$), (iv) a luma spatial edge strength value (e.g., $MB_{SE}$) and/or (v) a luma temporal (motion) edge strength average value (e.g., $MB_{TE}$). The luma motion average value $MB_{MOT}$, the luma DC value $MB_{DC}$, the luma high-frequency value $MB_{HF}$, the luma spatial edge strength average value $MB_{SE}$ and the luma temporal edge strength average value $MB_{TE}$ may be stored in respective data words (e.g., data words MbYMotAvg, MbYAvg, MbYHighFreqAvg, MbYEdgeAvg and MbYMotEdgeAvg).

Picture (or global) level statistics generally comprise (i) a global picture luma motion average value (e.g., $GP_{MOT}$), (ii) a global picture luma DC value (e.g., $GP_{DC}$), (iii) a global picture luma high-frequency average value (e.g., $GP_{HF}$), (iv) a global picture spatial edge strength average value (e.g., $GP_{SE}$) and/or (v) a global picture temporal edge strength average value (e.g., $GP_{TE}$). The global luma motion average value $GP_{MOT}$, the global luma DC value $GP_{DC}$, the global luma high-frequency average value $GP_{HF}$, the global luma spatial edge strength average value $GP_{SE}$ and the global luma temporal (motion) edge strength average value $GP_{TE}$ may be stored in respective data words (e.g., data words GPictYMot, GPictYSum, GPictYHighFreq, GPictYEdge and GPictMotEdge).

Figure 3:
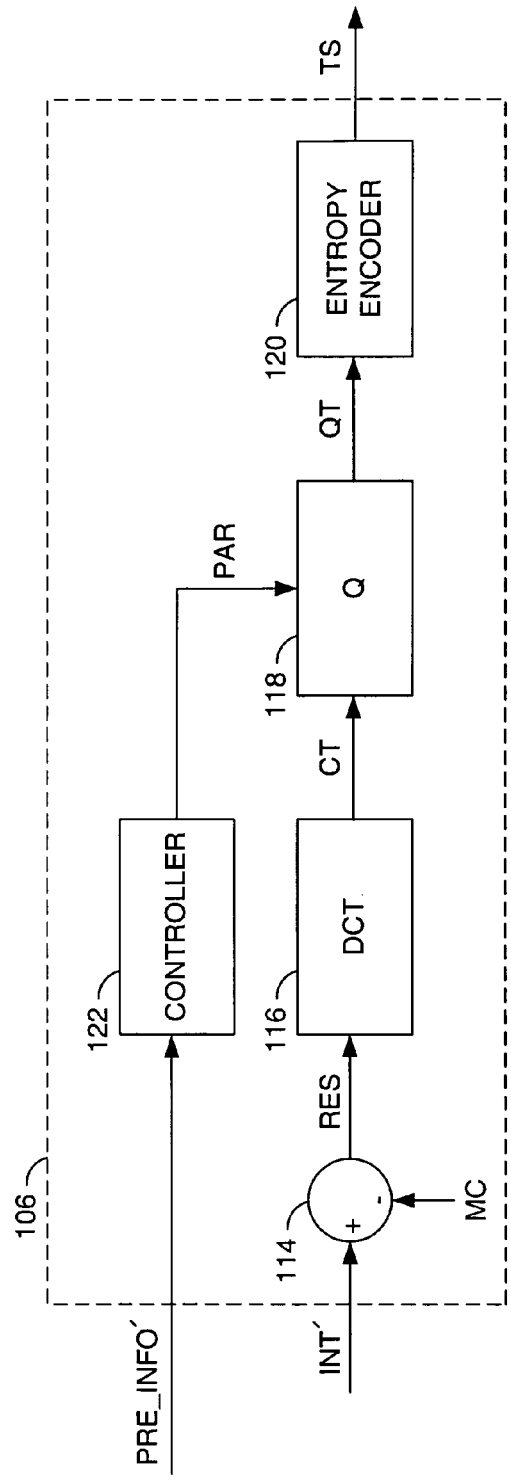
FIG. 3 is a detailed block diagram of a portion of an encoder module.

Referring to FIG. 3, a detailed block diagram of a portion of the encoder module 106 is shown. The encoder module 106 generally comprises an optional circuit (or block) 114, a circuit (or block) 116, a circuit (or block) 118, a circuit (or block) 120 and a circuit (or block) 122. The circuit 114 may receive the intermediate signal INT' from the memory module 108. A signal (e.g., MC) may also be received by the circuit 114. The circuit 114 may present a signal (e.g., RES) to the circuit 116. The circuit 116 may present a signal (e.g., CT) to the circuit 118. The circuit 118 may present a signal (e.g., QT) to the circuit 120. The circuit 120 may present the transport signal TS. A signal (e.g., PAR) may be presented from the circuit 122 to the circuit 118.

The signal MC may carry motion compensated data in embodiments where the signal INT' carries a video sequence of pictures. The circuit 114 may be operational to generate the signal RES as difference between the original picture in the signal INT' and the motion compensation data in the signal MC. The difference between the original picture and the motion compensation data may be referred to as residual data.

The circuit 116 may be referred to as a discrete cosine transform (DCT) module. The DCT module 116 may be operational to perform a discrete cosine transform on the residual data. The transformed data may be presented in the signal CT to the circuit 118.

The circuit 118 may be referred to as a quantizer module. The quantizer module 118 may be operational to quantize the residual data received in the signal CT based on quantization parameters received in the signal PAR. The quantized data may be presented in the signal QT to the circuit 120.

The circuit 120 may be referred to as an entropy encoder module. The entropy encoder module 120 may be operational to entropy encode the data in the signal QT to generate the transport stream TS.

The circuit 122 may be referred to as a controller module. The controller module 122 may be operational to control the overall encoding process of the encoder module 106. In particular, the controller module 122 may generate a respective quantization parameter in the signal PAR for each macroblock being encoded based on the statistical information received in the signal PRE_INFO'. The quantization parameters may be provided to the quantization module 118 in the signal PAR.

Figure 4:
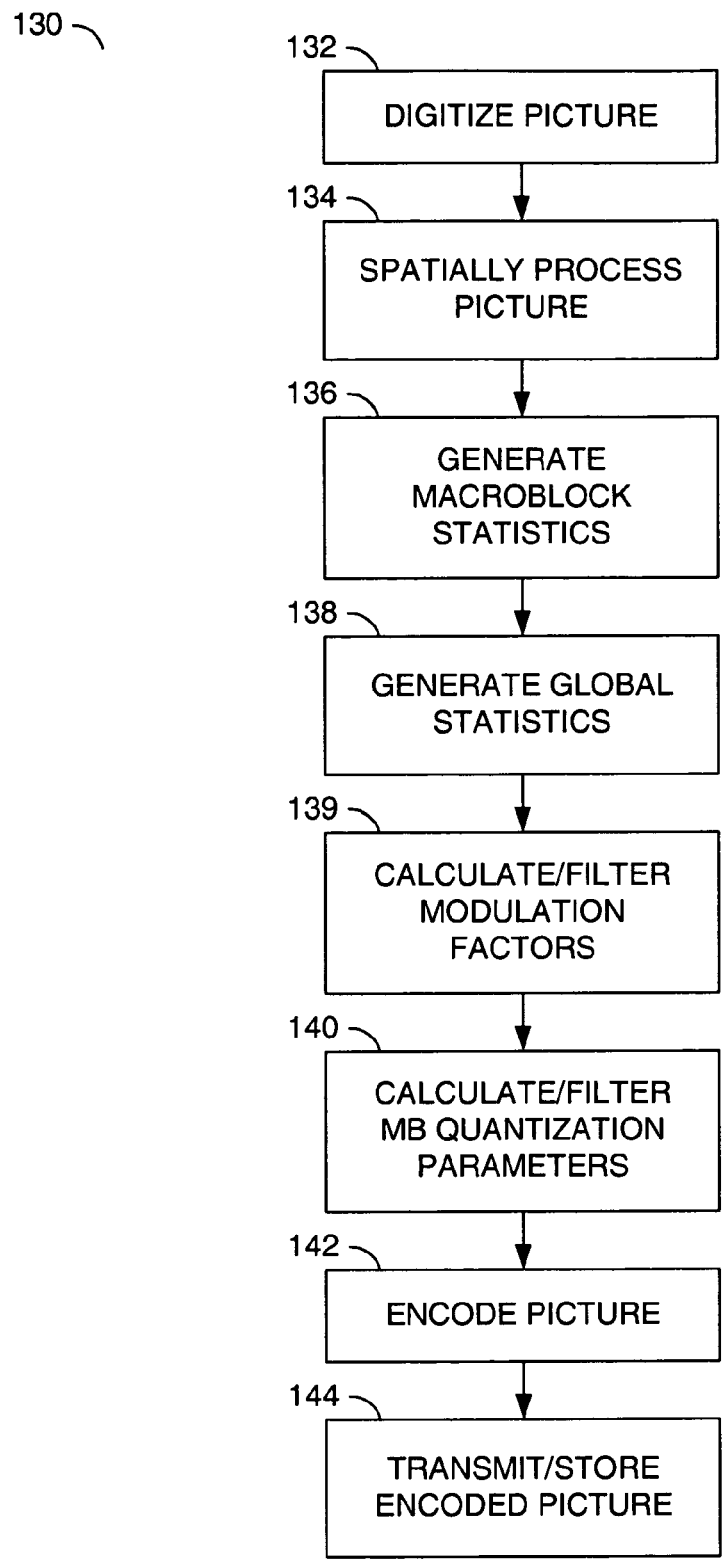
FIG. 4 is a flow diagram for an example method of encoding a picture.

Referring to FIG. 4, a flow diagram for an example method 130 of encoding a picture is shown. The method (or process) 130 generally comprises a step (or block) 132, a step (or block) 134, a step (or block) 136, a step (or block) 138, a step (or block) 139, a step (or block) 140, a step (or block) 142 and a step (or block) 144.

The method 100 generally begins with the A/D module 102 converting the analog picture data within the signal IMAGE_IN into digital form in the step 132. The spatial processing module 110 may then perform the pre-processing on the digitized pictures in the step 134. The macroblock statistics are generally calculated by the PPP module 110 and/or the statistics generator module 112 in the step 136. At the step 138, the statistics generator module 112 may calculate the global statistics for each picture.

In the step 139, the controller module 122 may calculate modulation factors for each macroblock. The modulation factors may be based one or more of the local statistics for the respective macroblock and one or more global statistics for the picture in which the respective macroblock resides. In some embodiments, calculations of the modulation factors may depend on whether the global statistics are greater than or less than the local statistics for the respective macroblocks.

Based on (i) the macroblock luma motion average value $MB_{MOT}$, obtained from the MbYMotAvg field of the data word generated by the PPP module 104 and (ii) the macroblock average over the picture value $GP_{MOT}$, obtained by (a) averaging $MB_{MOT}$ over the picture, (b) reading from the GPictYMot register or (c) setting to a predetermined fixed value, the controller module 122 may generate a motion modulation factor for luma motion (e.g., $\alpha_{MOT}$) per equation 1 as follows:

$$\alpha_{MOT} = \frac{(a \times MB_{MOT} + b \times GP_{MOT})}{(b \times MB_{MOT} + a \times GP_{MOT})} \text{ if } MB_{MOT} > GP_{MOT} \quad \text{Eq. (1)}$$
$$= \frac{(c \times MB_{MOT} + d \times GP_{MOT})}{(c \times MB_{MOT} + d \times GP_{MOT})} \text{ if } MB_{MOT} \leq GP_{MOT}$$

where constant pairs (i) "a" and "b" and (ii) "c" and "d" may be used to represent one or two ratios of the motion modulation factor. In general, the constants a and b may be set such that a motion modulation factor greater than 1 may be used for macroblocks with motion greater than the picture average. The constants c and d may be set such that a motion modulation factor smaller than 1 may be used for macroblocks with motion lower than the picture average.

In order to achieve the above motion modulation factors, (i) the value of the constant a should be greater than the value of the constant b and (ii) the value of constant c should be greater than the value of constant d. In some embodiments, the values of a and b may be set the same as the values of c and d, respectively. In other embodiments, the values of a and b may be set differently than the values of c and d. For example, values of a=c=2 and b=d=1 generally represent a motion modulation factor in a range of [0.5, 2]. As a result, a lower motion macroblock with respect to the picture average may have a modulation factor smaller than 1. A higher motion macroblock with respect to the average may have a modulation factor greater than 1. Other example values for the constants may include, but are not limited to, (i) a=c=3 and b=d=2 for a motion modulation factor in the range of [0.66, 1.5], (ii) a=c=4 and b=d=3 for a motion modulation factor in the range of [0.75, 1.33], etc. In some embodiments, a small motion modulation factor (e.g., a=c=4 and b=d=3) may result in an optimal modulation range.

Based on (i) the macroblock luma DC value $MB_{DC}$, obtained from the MbYAvg field of the data word and (ii) the macroblock average over the picture value $GP_{DC}$, obtained by (a) averaging $MB_{DC}$ over the picture, (b) reading from the GPictYSum register or (c) setting to a predetermined fixed value, a DC modulation factor for luma DC (e.g., $\alpha_{DC}$) may be calculated by the controller module 122 per equation 2 as follows:

$$\alpha_{DC} = \frac{(e \times MB_{DC} + f \times GP_{DC})}{(f \times MB_{DC} + e \times GP_{DC})} \text{ if } MB_{DC} > GP_{DC} \quad \text{Eq. (2)}$$
$$= \frac{(h \times MB_{DC} + g \times GP_{DC})}{(g \times MB_{DC} + h \times GP_{DC})} \text{ if } MB_{DC} \leq GP_{DC}$$

where constant pairs (i) "e" and "f" and (ii) "g" and "h" may be constants used to represent one or two ratios of the DC modulation factor. A DC modulation factor greater than 1 may be used for macroblocks with DC values away from (e.g., greater than or less than) the average value $GP_{DC}$.

In order to achieve the above DC modulation factor, (i) the constant e should be greater than the constant f and (ii) the constant g should be greater than the constant h. In some embodiments, the values of e and f may be set the same as the values of g and h, respectively. In other embodiments, the values of e and f may be set differently than the values of g and h. For example, values of e=g=2 and f=h=1 generally represent a modulation factor in a range of [1, 2], where a lower DC macroblock or a greater DC macroblock with respect to the average may have a higher modulation factor. In some embodiments, a small DC modulation factor (e.g., e=g=5 and f=h=4) may result in an optimal modulation range. The DC modulation factor will generally increase the macroblock step size because the DC modulation factor may always be greater than 1. A rate control calculated by the controller module 122 may compensate over time for the increased macroblock step size by decreasing a picture-level quantization parameter.

Based on (i) the macroblock luma high frequency average value $MB_{HF}$, obtained from the MbYHighFreqAvg field of the data word and (ii) the macroblock high frequency average over the picture $GP_{HF}$, obtained by (a) averaging $MB_{HF}$ over the picture, (b) read from the GPictYHighFreq register or (c) set to a predetermined fixed value, a high-frequency modulation factor for a luma high-frequency (e.g., $\alpha_{HF}$) may be calculated by the controller module 122 per equation 3 as follows:

$$\alpha_{HF} = \frac{(j \times MB_{HF} + k \times GP_{HF})}{(k \times MB_{HF} + j \times GP_{HF})} \text{ if } MB_{HF} > GP_{HF} \qquad \text{Eq. (3)}$$

$$= \frac{(m \times MB_{HF} + p \times GP_{HF})}{(p \times MB_{HF} + m \times GP_{HF})} \text{ if } MB_{HF} \leq GP_{HF}$$

where constant pairs (i) "j" and "k" and (ii) "m" and "p" may represent one or two ratios of the high-frequency modulation factor. The constants j and k may be set such that a high-frequency modulation factor greater than 1 may be used for macroblocks with a high-frequency value greater than the picture average value. The constants m and p may be set such that a high-frequency modulation factor smaller than 1 may be used for macroblocks with a high-frequency value lower than the picture average value.

In order to achieve the above high-frequency modulation factor, (i) the constant j is generally greater than the constant k and (ii) the constant m is generally greater than the constant p. In some embodiments, the values of j and k may be set the same as the values of m and p, respectively. In other embodiments, the values of j and k may be set differently than the values of m and p. In some embodiments, a large modulation factor (e.g., j=m=2 and k=p=1), corresponding to a high-frequency modulation factor in a range of [0.5, 2], may provide an optimal modulation range.

Based on (i) the macroblock spatial edge strength average value $MB_{SE}$, obtained from the MbYEdgeAvg field of the data word and (ii) the global luma spatial edge strength average value $GP_{SE}$, obtained by (a) averaging $MB_{SE}$ over the picture, (b) read from the GPictYEdge register or (c) set to a predetermined fixed value, a spatial edge modulation factor for a luma edge (e.g., $\alpha_{SE}$) may be calculated by the controller module 122 per equation 4 as follows:

$$\alpha_{SE} = \frac{(q \times MB_{SE} + r \times GP_{SE})}{(r \times MB_{SE} + q \times GP_{SE})} \text{ if } MB_{SE} > GP_{SE} \qquad \text{Eq. (4)}$$

$$= \frac{(s \times MB_{SE} + t \times GP_{SE})}{(t \times MB_{SE} + s \times GP_{SE})} \text{ if } MB_{SE} \leq GP_{SE}$$

where constant pairs (i) "q" and "r" and (ii) "s" and "t" may represent one or two ratios of the spatial edge modulation factor. The constants q and r may be set such that a spatial edge modulation factor less than 1 may be used for macroblocks with a spatial edge strength value greater than the picture average value. The constants s and t may be set such that a spatial edge modulation factor greater than 1 may be used for macroblocks with a spatial edge strength value lower than the picture average value.

In order to achieve the above spatial edge modulation factor, (i) the constant q is generally less than the constant r and (ii) the constant s is generally less than the constant t. In some embodiments, the values of q and r may be set the same as the values of s and t, respectively. In other embodiments, the values of q and r may be set differently than the values of s and t.

Based on (i) the macroblock temporal edge strength average value $MB_{TE}$, obtained from the MbYMotEdgeAvg field of the data word and (ii) the global luma temporal edge strength average value $GP_{TE}$, obtained by (a) averaging $MB_{TE}$ over the picture, (b) read from the GPictYMotEdge register or (c) set to a predetermined fixed value, a temporal edge modulation factor for a luma edge (e.g., $\alpha_{TE}$) may be calculated by the controller module 122 per equation 5 as follows:

$$\alpha_{TE} = \frac{(v \times MB_{TE} + w \times GP_{TE})}{(w \times MB_{TE} + v \times GP_{TE})} \text{ if } MB_{TE} > GP_{TE} \qquad \text{Eq. (5)}$$

$$= \frac{(y \times MB_{TE} + z \times GP_{TE})}{(z \times MB_{TE} + y \times GP_{TE})} \text{ if } MB_{TE} \leq GP_{TE}$$

where constant pairs (i) "v" and "w" and (ii) "y" and "z" may represent one or two ratios of the temporal edge modulation factor. The constants v and w may be set such that a temporal edge modulation factor less than 1 may be used for macroblocks with a temporal edge strength value greater than the picture average value. The constants y and z may be set such that a temporal edge modulation factor greater than 1 may be used for macroblocks with a temporal edge strength value lower than the picture average value.

In order to achieve the above temporal edge modulation factor, (i) the constant v is generally less than the constant w and (ii) the constant y is generally less than the constant z. In some embodiments, the values of v and w may be set the same as the values of y and z, respectively. In other embodiments, the values of v and w may be set differently than the values of y and z.

The edge detection is generally performed in three dimensions on the luma signal in order to determine static and moving edge transitions. Detection may be performed by parallel Sobel operators. Four possible edge detection directions may be considered for spatial edges. Four possible edge detection directions may be considered for temporal edges. The edge detection directions generally comprise horizontal, vertical, diagonal left and diagonal right directions. For each of the directions, an average edge strength for the macroblock may be computed. A strongest direction may be identified for both a spatial edge strength and a temporal edge strength. The strength values may be stored in the memory 108 for future reference.

Collection of the macroblock statistics may be performed at one or more among several different block sizes. For example, 16×16, 16×8, 8×16, 8×8, 8×4, 4×8 and/or 4×4 blocks may be initially examined. Depending on the statistics under consideration, minimum values, maximum values, or median values of the smaller blocks (e.g., 8×8 or 4×4) may be used to generate the statistics for the larger macroblocks (e.g., 16×16). Furthermore, global (or picture) average statistics may be generated based on the statistics of the smaller macroblocks and/or the larger macroblocks. For example, a high-frequency statistic for a 16×16 macroblock may be set to the highest high-frequency statistic for the sixteen 4×4 blocks of the macroblock. In another example, a spatial edge statistic for the 16×16 macroblock may be set to the largest spatial edge from the four 8×8 blocks of the macroblock. In still another example, the DC statistic for the 16×16 macroblock may be set to a median of the smaller blocks within the macroblock. For a motion statistic of the 16×16 macroblock, an average motion value may be calculated from all of the smaller blocks within the macroblock.

The high-frequency statistics used above are generally an implementation for measuring an amount of activity present in the macroblocks. In some embodiments, the activity may be determined by measuring other aspects of the macroblocks. For example, the HVS is less sensitive to high texture areas. As such, texture or variances within the macroblocks may be measured. The macroblock quantization parameter may be increased in the high texture areas.

One or more of the modulation factors $\alpha_{MOT}$, $\alpha_{DC}$, $\alpha_{HF}$, $\alpha_{SE}$ and/or $\alpha_{TE}$ may be optionally low-pass filtered to reduce or minimize fluctuations in the calculated values. Filtering may be performed spatially and/or temporally. The spatial filtering may prevent sharp changes in the modulation factors over small spatial regions (e.g., a region of 3×3 blocks to 5×5 blocks). The temporal filtering may prevent rapid changes in the modulation factors over a small number of pictures (e.g., 2 pictures to 5 pictures). Other sizes of spatial regions and/or temporal regions may be implemented to meet the criteria of a particular application.

In the step 140, the controller module 122 may calculate a quantization parameter (or a delta quantization parameter) for each macroblock. Calculation of each of the macroblock quantization parameters may be based on one or more of the modulation factors. Furthermore, the macroblock quantization parameters may be based on a picture quantization parameter.

The modulation factors described above may be combined by the controller module 122 to obtain a quantization parameter (e.g., $MB_{QP}$) for each macroblock. A picture quantization parameter (e.g., $PIC_{QP}$), generally determined by a high level rate control, may be used to modulate each the quantization parameter $MB_{QP}$ of each macroblock. First, the picture quantization parameter $PIC_{QP}$ may be converted to a quantizer step size (e.g., $PIC_{QUANT}$). For H.264, the quantizer step size $PIC_{QUANT}$ may be calculated per equation 6 as follows:

$$PIC_{QUANT} = 2\hat{}(\max(PIC_{QP}-4,0)/6) \qquad \text{Eq. (6)}$$

For MPEG-2, the quantizer step size $PIC_{QUANT}$ may be calculated per equation 7 as follows:

$$PIC_{QUANT} = 2\hat{}PIC_{QP} \qquad \text{Eq. (7)}$$

Other linear and/or non-linear quantizer step sizes may be calculated based on the criteria of a particular application.

The quantization parameter to quantizer step size conversion (e.g., equations 6 and 7) may be implemented as a table lookup (e.g., Lookup Table 109 in FIG. 1). The table lookup generally allows for a linear or a non-linear transformation of the quantizer step size based on the modulation factors. The modulated quantizer step size for each macroblock of the picture may be obtained by multiplying all the modulation factors by the picture quantizer value per equation 8 as follows:

$$MB_{QUANT} = \alpha_{MOT} \times \alpha_{DC} \times \alpha_{HF} \times \alpha_{SE} \times \alpha_{TE} \times PIC_{QUANT} \qquad \text{Eq. (8)}$$

Once the modulated macroblock quantizer value $MB_{QUANT}$ is obtained, the macroblock quantizer value $MB_{QUANT}$ may be converted back to the macroblock quantization parameter value $MB_{QP}$. For H.264, the conversion may be performed per equation 9 as follows:

$$MB_{QP} = 6 \log_2(\alpha_{MOT} \times \alpha_{DC} \times \alpha_{HF} \times \alpha_{SE} \times \alpha_{TE}) + PIC_{QP} \qquad \text{Eq. (9)}$$

Similar conversions may be performed for other standards and proprietary formats. The conversion from macroblock quantizer value $MB_{QUANT}$ into the macroblock quantization parameter value $MB_{QP}$ may be implemented as a reverse table lookup.

In some embodiments a quantization parameter delta value (e.g., $\Delta MB_{QP}$) may be calculated and used instead of the multiplicative factor $MB_{QP}$. Use of the quantizer parameter delta value $\Delta MB_{QP}$ may be simpler in that the picture quantizer value $PIC_{QUANT}$ may remain undetermined. As such, a macroblock quantization parameter delta list for all macroblocks in the picture may be generated strictly from the local (macroblock) statistics and the global (picture) statistics gathered by the PPP module 104. From equations (6) and (8), the macroblock quantization parameter delta value for H.264 may be calculated per equation 10 as follows:

$$\Delta MB_{QP} = 6 \log_2(\alpha_{MOT} \times \alpha_{DC} \times \alpha_{HF} \times \alpha_{SE} \times \alpha_{TE}) \qquad \text{Eq. (10)}$$

Similar calculations may be performed for other standards and proprietary formats.

The macroblock quantization parameters $MB_{QP}$, quantizer step sizes $MB_{QUANT}$ and/or delta quantization parameters $\Delta MB_{QP}$ may be optionally low-pass filtered to reduce or minimize fluctuations in the calculated values. Filtering may be performed spatially and/or temporally. The spatial filtering may prevent sharp changes in the quantization step sizes over small spatial regions (e.g., a region of 3×3 blocks to 5×5 blocks). The temporal filtering may prevent rapid changes in the quantization step sizes over a small number of pictures (e.g., 2 pictures to 5 pictures). Other sizes of spatial regions and/or temporal regions may be implemented to meet the criteria of a particular application.

In the step 142, the difference module 114, the DCT module 116, the quantization module 118 and the entropy encoder module 120 may encode the pictures based in part on the individual macroblock quantization parameter values (or the macroblock quantization parameter delta values). The transport stream TS may be transmitted from the encoder module 106 and/or stored in a medium in the step 144.

Simulations were performed on the method 100. For simulation purposes, control was provided to (i) enable/disable each modulation factor individually and (ii) set each modulation factor ratio represented by the constant pairs.

Sensitivity of the human eye to changes in luminance contrast are generally inconsistent over the luminance range. In particular, the human eye is most sensitive to changes in contrast in the mid grey level. Thus, humans appear to be more sensitive to coding artifacts in the mid-grey level rather than the high and low luminance levels and the quantization step should be modulated accordingly.

In order to measure the contrast threshold, a luminance level of a small patch (e.g., 64×64) of pixels located at the center of flat area of constant luminance value was varied. The luminance level difference at which the patch could be perceived different from the background generally represented the contrast threshold for the particular luminance level of the background. The experiment was carried out for the entire luminance range to measure the contrast threshold at each luminance level.

Figure 5:
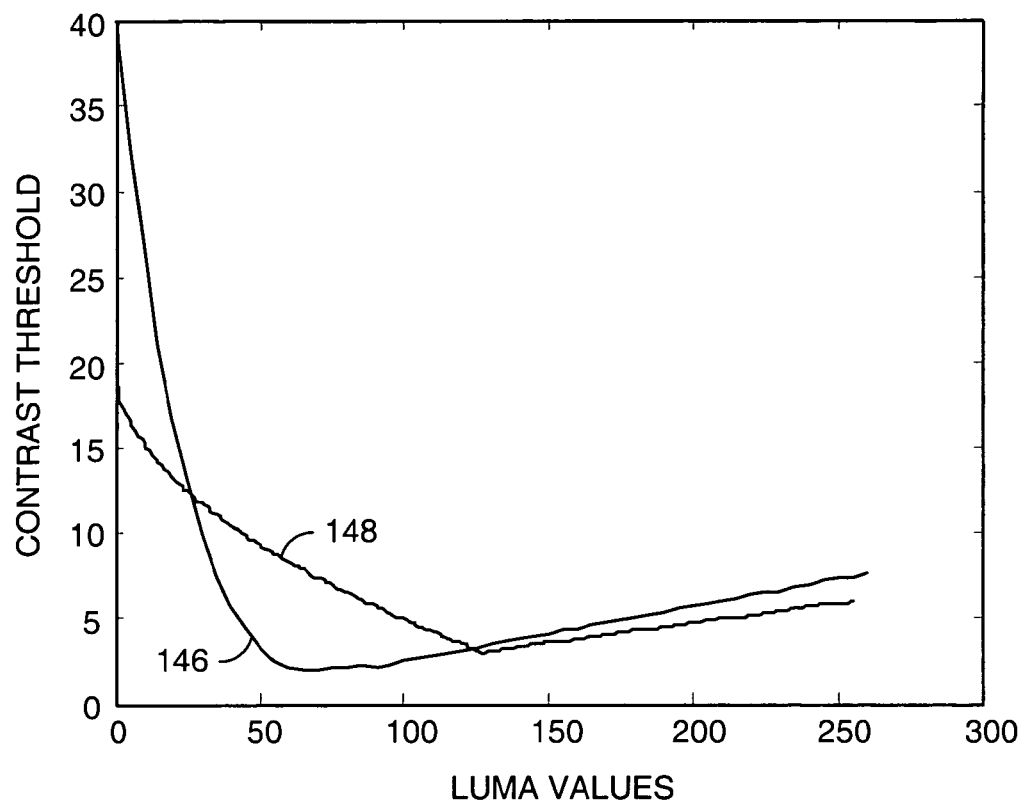
FIG. 5 is a diagram of a contrast threshold at different luminance values.

Referring to FIG. 5, a diagram of the contrast threshold at different luminance values is shown. A first curve 146 was derived from the experiments while a second curve 148 is a conventional just-noticeable distortion (JND) contrast threshold curve. The experiments generally show that the human eye is most sensitive to grey level of 64 (in a range of 0 to 255) while the JND curve 148 suggests that the eye is most sensitive to a grey value of 128. A possible explanation for the differences may be that the conventional contrast thresholds are highly sensitive to the luminance and the ambient light conditions.

The curves 146 and 148 generally show that the human eye is less sensitive to contrast changes at the lower luminance level than the higher luminance levels. The contrast sensitivity generally decreases exponentially moving away from the mid-grey level to the lower luminance levels. Furthermore, the contrast sensitivity tends to decrease in a linear fashion moving toward the higher luminance values.

The curve 146 suggests that the modulation factor for the luminance may be modulated in such a way to produce (i) an exponential increase in the values of alpha for lower luminance values and (ii) a linear increase for higher luminance values. The JND curve 148 suggests that the eye is most sensitive to a luminance value of 128 and thus a constant value of 128 may be used for the global luma DC average value $GP_{DC}$ in equation (2).

Figure 6:
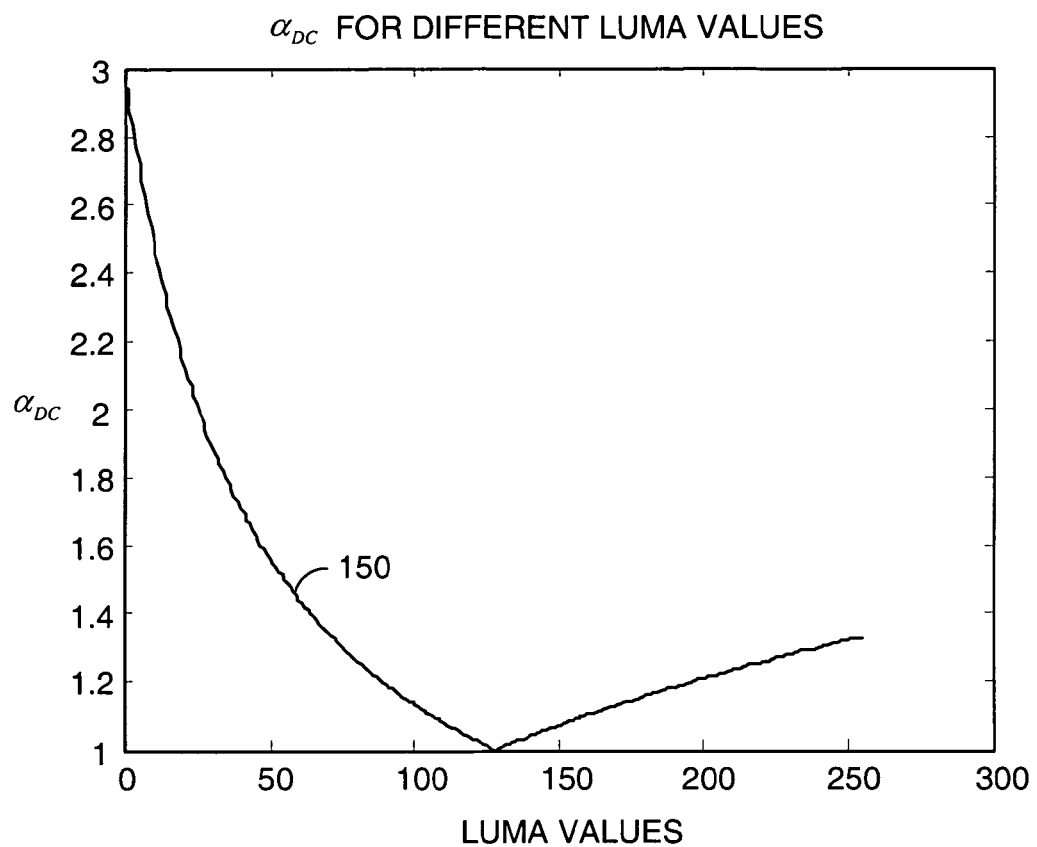
FIG. 6 is a diagram of an example DC modulation curve.

Referring to FIG. 6, a diagram of an example DC modulation curve 150 is shown. The DC modulation curve 150 may be obtained by fixing the value of the global luma DC value $GP_{DC}$ to 128 and using values of g=3, h=1 for luminance values less than 128 and using values of e=5, f=2 for luminance values greater than 128.

Various encoding were done at different bit-rates to test whether the constant value of 128 was a better choice than using the global average of luma in equation (2). From theoretical arguments, a constant value of 128 should have been more suitable than the varying global average. Other values, such as 64 and 96 were also examined. The encoding of the pictures performed with the constant value of 128 generally looked visually better than using 64 or 96. However, the encoding of the pictures performed using the actual global average of luma typically had better visual quality than using the constant value of 128. As such, equation (2) may be implemented as follows:

1. Use the global average instead of a constant value.
2. In cases where $MB_{DC} < GP_{DC}$, then g=3 and h=1.
3. In cases where $MB_{DC} > GP_{DC}$, then e=5 and f=2.

The function performed by the diagrams of FIGS. 1-3 and the flow diagram of FIG. 4 may be implemented using a conventional general purpose digital computer programmed according to the teachings of the present specification, as will be apparent to those skilled in the relevant art(s). Appropriate software coding can readily be prepared by skilled programmers based on the teachings of the present disclosure, as will also be apparent to those skilled in the relevant art(s).

The present invention may also be implemented by the preparation of ASICs, FPGAs, or by interconnecting an appropriate network of conventional component circuits, as is described herein, modifications of which will be readily apparent to those skilled in the art(s).

The present invention thus may also include a computer product which may be a storage medium including instructions which can be used to program a computer to perform a process in accordance with the present invention. The storage medium can include, but is not limited to, any type of disk including floppy disk, optical disk, CD-ROM, magneto-optical disks, ROMs, RAMs, EPROMs, EEPROMs, Flash memory, magnetic or optical cards, or any type of media suitable for storing electronic instructions.

While the invention has been particularly shown and described with reference to the preferred embodiments thereof, it will be understood by those skilled in the art that various changes in form and details may be made without departing from the spirit and scope of the invention.

What is claimed is:

1. A method for encoding a picture, comprising the steps of:
   (A) generating at least one respective macroblock statistic from each of a plurality of macroblocks in said picture, the at least one respective macroblock statistic being selected from a group that consists of a luminance motion value, a luminance DC value, a luminance high-frequency value, a spatial edge strength value and a temporal edge strength value;
   (B) generating at least one global statistic from said picture by averaging the at least one respective macroblock statistic of the plurality of macroblocks over said picture; and
   (C) generating a respective modulation factor and a respective macroblock quantization parameter for each of said macroblocks based on both (i) said at least one respective macroblock statistic and (ii) said at least one global statistic.

2. The method according to claim 1, wherein each of said respective macroblock quantization parameters is further based on a picture quantization parameter.

3. The method according to claim 1, wherein each of said respective macroblock quantization parameters comprises a respective delta quantization parameter generated only from said at least one respective macroblock statistic and said at least one global statistic.

4. The method according to claim 1, said respective macroblock quantization parameter is generated based on said respective modulation factor.

5. The method according to claim 1, wherein the step of generating said respective modulation factor is calculated using (i) a first equation if said at least one respective macroblock statistic is greater than said at least one global statistic and (ii) a second equation if said at least one respective macroblock statistic is less than said at least one global statistic.

6. The method according to claim 1, further comprising the step of:
   spatially filtering said respective modulation factors prior to generating said respective macroblock quantization parameters.

7. The method according to claim 1, further comprising the step of:
   temporally filtering said respective modulation factors prior to generating said respective macroblock quantization parameters.

8. The method according to claim 1, further comprising the step of:
   spatially filtering said respective macroblock quantization parameters.

9. The method according to claim 1, further comprising the step of:
   temporally filtering said respective macroblock quantization parameters.

10. The method according to claim 1, wherein at least one of said at least one global statistics comprises a fixed value.

11. The method according to claim 1, further comprising the step of:
    spatially processing said picture before generating said at least one respective macroblock statistic.

12. The method according to claim 1, wherein said picture forms a portion of a video stream.

13. The method according to claim 1, wherein said picture comprises a still image.

14. A system comprising:
    a processor configured to (i) generate at least one respective macroblock statistic from each of a plurality of macroblocks in a picture and (ii) generate at least one global statistic from said picture, the at least one respective macroblock statistic being selected from a group that consists of a luminance motion value, a luminance DC value, a luminance high-frequency value, a spatial edge strength value and a temporal edge strength value, the at least one global statistic averaging the at least one respective macroblock statistic of the plurality of macroblocks over said picture; and an encoder configured to generate a respective modulation factor and a respective macroblock quantization parameter for each of said macroblocks based on both (i) said at least one respective macroblock statistic and (ii) said at least one global statistic.

15. The system according to claim 14, wherein said encoder is further configured to generate a respective macroblock quantization step size for each of said macroblocks based on said respective macroblock quantization parameter.

16. The system according to claim 15, further comprising a memory configured to store a lookup table for converting said respective macroblock quantization step sizes to said respective macroblock quantization parameters.

17. The system according to claim 14, wherein said at least one respective macroblock statistic comprises a texture value.

18. The system according to claim 14, wherein said at least one respective macroblock statistic comprises at least one of (i) a luminance motion value, (ii) a luminance DC value, (iii) a luminance high-frequency value, (iv) a spatial edge strength value and (v) a temporal edge strength value.

19. The system according to claim 14, wherein said encoder is further configured to encode said picture into an output signal compliant with at least one of an International Organization for Standardization/International Electrotechnical Commission 14496-10 standard and an International Telecommunication Union-Telecommunications Revised Recommendation H.264.

20. A system comprising:
means for generating at least one respective macroblock statistic from each of a plurality of macroblocks in a picture, the at least one respective macroblock statistic being selected from a group that consists of a luminance motion value, a luminance DC value, a luminance high-frequency value, a spatial edge strength value and a temporal edge strength value;
means for generating at least one global statistic from said picture by averaging the at least one respective macroblock statistic of the plurality of macroblocks over said picture; and
means for generating a respective modulation factor and a respective macroblock quantization parameter for each of said macroblocks based on both (i) said at least one respective macroblock statistic and (ii) said at least one global statistic.

* * * * *